3,795,723
BETA ALUMINA PRODUCTION
Ronald L. Clendenen, Orinda, and Eugene E. Olson, Oakland, Calif., assignors to Shell Oil Company, Houston, Tex.
No Drawing. Filed Mar. 29, 1972, Ser. No. 236,162
Int. Cl. C01f 7/04
U.S. Cl. 264—65                                8 Claims

ABSTRACT OF THE DISCLOSURE

When a mixture of powders of an oxidic aluminum compound, an oxidic sodium compound and optionally additives, is hot-pressed into a solid body at a temperature of from about 1000° C. to about 1800° C. and a pressure of greater than about 1000 p.s.i. and the body is then hot-forged at similar conditions a sodium beta alumina having an oriented crystal structure and thus a high ionic conductivity results.

BACKGROUND OF THE INVENTION

Field of the invention

This invention relates to a process for preparing sodium beta alumina and its unique sodium beta alumina product.

The prior art

Sodium beta alumina is a form of alumina having a chemical composition which varies between about $$Na_2O \cdot 4Al_2O_3$$

and about $Na_2O \cdot 11Al_2O_3$. Sodium beta alumina has the property of being a solid electrolyte; that is, ions, such as sodium ions and the other alkali metal ions, can be conducted through a solid barrier of sodium beta alumina. Sodium beta alumina's electronic conductivity is low. Because of these properties sodium beta alumina is used as a barrier in sodium-sulfur batteries.

Sodium-sulfur batteries comprise two chambers. One chamber contains molten sodium metal and the other chamber contains molten sulfur. The chambers are separated by a membrane through which sodium ions can migrate. In operation, sodium, as ions, migrates from the sodium chamber to the sulfur chamber and there forms sodium sulfide. This ionic migration causes an electrical potential to be generated. Sodium beta alumina has become the membrane of choice in sodium-sulfur batteries. The sodium-sulfur membrane must have a high sodium ion conductivity if a good battery is to be achieved. The conductivity of the beta alumina membrane may be increased in several manners. For one, the membrane may be made very thin. This, however, poses strength hazards. For another, the beta alumina may be modified by adding conductivity improving additives. U.S. 3,607,436 issued Sept. 21, 1971, to Charles et al., for example teaches the addition of magnesia and yttria for this purpose.

The present invention relates to yet another way to increase sodium beta alumina's conductivity. It involves a new method of preparation which leads to beta aluminas having relatively higher ionic conductivities in a specific crystallographic direction.

Conventionally, sodium beta alumina is produced by preparing a substantially uniform mixture of grains of aluminium oxide ($Al_2O_3$) and a sodium compound such as sodium oxide or carbonate, optionally additives, and often a binder such as wax or gum; cold-pressing the mixture into a compact body; and then sintering the body to form the final sodium beta alumina product. Processes of this type are described, for example, in U.S. 3,535,163 issued Oct. 20, 1970 to Dzieciuch et al., and British Pat. 1,185,725 of Associated Electrical Industries published Mar. 25, 1970.

The beta alumina production process of the present invention employs to advantage techniques referred to as "hot-pressing" and "hot-forging." "Hot-pressing" involves simultaneously applying substantial pressures, for example 1000 to 30,000 p.s.i., at elevated temperatures, for example up to about 2500° C. "Hot-forging" involves simultaneously applying a deforming pressure and elevated temperatures to a body. In the teachings of the prior art, hot-pressing has often been used to prepare ceramic bodies, see for example U.S. 3,311,482 issued Mar. 28, 1967 to Klingler et al. or U.S. 3,379,523 issued Apr. 23, 1968 to Chaklader. Hot-forging has been used to improve the magnetic properties of ferrite ceramic magnets in, for example, Haag Annual Report Mar. 1969–70 Office of Naval Research contract N00014–68–C–0364 and in co-pending patent application Ser. No. 183,838 (Series of 1970), of Olson, Clendenen and Schlaudt.

STATEMENT OF THE INVENTION

It has now been found that sodium beta aluminas having superior ionic conductivity properties are produced by the process of:
1. Admixing an oxidic aluminum compound, an oxidic sodium compound and optionally one or more additives;
2. Hot-pressing the mixture into a solid body having a density of not less than 90% of the theoretical maximum by applying a temperature of from about 1000° C. to about 1800° C. and a pressure of from about 1000 p.s.i. to about 30,000 p.s.i. for from 5 to 30 minutes and
3. Hot-forging the resulting solid body at a temperature of from 1000° C. to about 1800° C.

The sodium beta alumina products of this process have a unique oriented crystal structure which results in high ionic conductivities in a direction perpendicular to the C axis of their hexagonal lattice.

DETAILED DESCRIPTION OF THE INVENTION

The admixing step

In the first step of the process of this invention an admixture of powders of an oxidic aluminum compound and an oxidic sodium compound is prepared.

As used herein, the terms oxidic aluminum compound and oxidic sodium compound include oxides and, in addition, materials which thermally decompose in the presence of oxygen to yield oxides at temperatures of up to about 1200° C., for example, aluminum hydroxide, the hydrated aluminum oxides, sodium carbonate, sodium bicarbonate and the like. For simplicity, the oxidic aluminum and sodium compounds are referred to herein in a singular form. It is, of course, within the scope of this invention to use combinations of several oxidic sodium or aluminum compounds.

The oxidic aluminum and sodium compounds are employed and admixed as finely grained powders. The powders should be as fine as possible, ideally. Grain size of from 0.005 microns, which is about the smallest size readily obtainable, up to about 2 microns are suitable, with particle size of from 0.02 to 1.5 microns being preferred.

The oxidic aluminum compound and the oxidic sodium compound are admixed in proportions which give a final beta alumina composition containing from about 4 to about 11 atoms of aluminum per atom of sodium, that is corresponding to final beta alumina compositions between about $Na_2O \cdot 4Al_2O_3$ and $Na_2O \cdot 11Al_2O_3$. For example, when the oxidic aluminum compound is alumina, $Al_2O_3$, and the oxidic sodium compound is sodium carbonate ($Na_2CO_3$) the admixture would contain from 4 to 11 moles of alumina for each mole of sodium carbonate. If aluminum hydroxide ($Al(OH)_3$) were substituted for alumina, however, from 8 to 22 moles would be required to give the desired alumina to sodium ratio.

It is preferred to control the admixture composition to maintain the aluminum to sodium atomic ratio between about 5:1 and about 10:1 and most preferred to maintain the ratio between about 5:1 and 9:1.

The process of this invention may be used, if desired, with advantage in conjunction with the addition of various beta alumina additives. Suitable additives include, for example, lithium fluoride, lithium hydroxide, magnesia, yttria, silica, calcium oxide and beryllia. These optional materials are generally added in, at most, minor amounts. Preferably from 0 to about 4% by weight, based on the total composition, of additives are employed.

The oxidic sodium and aluminum compounds (and optional additives) should be intimately mixed. Conventional means for mixing, stirring, tumbling and the like are suitable for this purpose.

The hot-pressing step

The admixture of oxidic aluminum and sodium compounds is hot-pressed. The hot-pressing is carried out at a temperature of from 1000° C. to 1800° C., preferably 1200° C. to 1700° C. and most preferably 1400° C. to 1600° C. The pressure, which is applied uniaxially, suitable for example, in a moving-piston die, is over 1000 p.s.i. and generally is in the range 1000 to 30,000 p.s.i. Higher pressures would be very useful but at the temperatures involved require highly exotic, expensive dies. Preferred pressures are from about 3000 p.s.i. to about 20,000 p.s.i. With a particularly good balance of performance and die expense being struck in the range of from 5000 p.s.i. to about 10,000 p.s.i.

The hot-pressing should be continued until the admixed powder is formed into a solid body having a density not less than about 90% of the theoretical maxium for the composition. Preferably, the hot pressing is continued until a density of not less than about 95% of the maximum is obtained. Although the exact times required depend upon the temperature and pressure employed, generally hot-pressing times of from 5 to 30 minutes at final temperature are suitable with times of from 10 to 20 minutes being preferred.

The hot-pressing may conveniently be carried out in air, in an inert atmosphere or in vacuum.

The product of the hot-pressing is a solid body of sodium beta alumina. It is not significantly better than conventionally-prepared sodium beta aluminas as an ionic conductor.

The hot-forging step

The solid body produced in the hot-pressing step next is hot-forged. Hot-forging is carried out by subjecting the body to elevated temperatures, suitably 1000° C. to 1800° C., and applying a deforming pressure. These temperatures are substantially below the melting point of conventionally-prepared sodium beta alumina (2000–2200° C.). It has been found, however, that hot-press-formed materials are surprisingly somewhat ductile at even 1300° C.

The hot-forging may be carried out by placing the alumina body between the platens of a press and applying pressure, by passing the body between rollers or by other means which will enable the body to be deformed. By whatever technique it is suitable to employ pressures of from 1000 p.s.i. to 20,000 p.s.i. Preferred pressures are from 3000 p.s.i. to 20,000 p.s.i. with 5000 p.s.i. to 10,000 p.s.i. being most preferred.

The period of forging at temperature is usually from about 1 to about 30 minutes, preferably it is from about 3 to 20 minutes with times of from 5 to 15 minutes being most preferred. The hot-forging may be carried out in air, inert atmosphere or in a vacuum.

The amount of forging should be controlled. The forging should be continued until about a 30 to 70% deformation is achieved, that is to say, until the dimension of the body along the axis of forging is reduced from its original value to a value of from about 0.7 to 0.3 times the original value. The forging step, in addition to deforming the solid body, completely densifies it as well. Since the solid bodies are at least 90% dense prior to hot-forging, the change of dimension attributable to densification can be essentially disregarded. It is preferred to continue forging until the dimension of the body along the axis of forging is reduced from its oiginal value to a value of from about 0.4 to 0.6 times the original value.

The sodium beta alumina product

The sodium beta alumina product of this invention has a substantially higher ionic conductivity than conventionally-prepared polycrystalline sodium beta aluminas or than the hot-pressed but not hot-forged intermediate product of this invention.

The reason for this enhanced conductivity apparently is a unique crystalline structure in the beta aluminas of this invention. Polycrystalline sodium beta aluminas conventionally have an almost random crystal structure. The product of this invention has a highly ordered, oriented crystallite structure. The products of this invention are at least 70% oriented, that is as least 70% of the crystallites which make up the products are pointing in the same direction. Preferably the crystallites are at least 80% oriented.

This oriented structure may be demonstrated in a number of ways, for example, by means of electronphotomicrographs, Laue X-ray patterns or by multidirectional ionic conductivity measurements.

The crystallites which make up the sodium beta alumina products of this invention generally are from 1 to 30 microns in largest dimension.

In addition to having an aligned (oriented) crystal structure, the sodium beta aluminas are characterized as being of high density, preferably at least 95% of the theoretical maximum, most preferably from 97 to 99.5% of the theoretical maximum. They are in some cases translucent.

By analysis, they contain sodium, aluminum and oxygen in proportions corresponding to the formulas between about $Na_2O \cdot 4Al_2O_3$ and $Na_2O \cdot 11Al_2O_3$ and more preferably they have analysis corresponding to the formulas between $Na_2O \cdot 5Al_2O_3$ and $Na_2O \cdot 9Al_2O_3$. Of course, they may contain the additives described above as useful in beta aluminas.

The invention will be further described by the following examples, illustrative embodiments and comparative experiments. These are intended as illustrations of typical practice of the process of this invention and of the type of sodium beta alumina produced thereby and not as limitations on the scope of this invention.

EXAMPLE I

Reagent grade sodium carbonate (38.6 grams) and Reagent grade anhydrous aluminum hydroxide (454 grams) were mixed as 0.05 micron powders for 6 hours in a ball mill. 40 grams of thoroughly-blended mixed oxides were then placed in a graphite piston die and heated in air to 1500° C. in a graphite heating element furnace at a rate of 20° C./minute. As the temperature passed about 600° C., a pressure of about 4000 p.s.i. was applied. The pressure was maintained for 10 minutes after the temperature had reached 1500° C.

The pressure was then released and the apparatus was cooled. The product was about 0.94 inch in diameter and about 0.84 inch thick disk of beta alumina having a density of about 99% of the theoretical maximum was then removed. The product had a composition equivalent to the formula $Na_2O \cdot 8Al_2O_3$. The product did not have a highly oriented crystal structure.

The ionic conductivity of this product was measured as follows: A ring was cut from this product. Iionic conductivity measurements at 1600 Hz. were performed with the current path perpendicular to the hot-pressing direction (from center hole to outside surface). The conductivity measurements were made in an equimolar molten salt solution of $NaNO_2/NaNO_3$ in the temperature range of 200–300° C. over a period not exceeding 1½ hours. For the above geometry and electrolytic cell the specific resistivity of this hot-pressed beta alumina sample was found to be 25–28 ohm/cm. at 290° C. The correction for the conductivity of the molten salt electrolyte was taken into consideration in all measurements.

EXAMPLE II

An identical product as produced in Example I was placed between the platens of a hot-forging press. In a vacuum it was heated to 1600° C. A pressure of 4000 p.s.i. was then applied. The sample deformed at a strain rate of about 10% per minute. The forging was continued for about 6 minutes until the dimension along the axis of forging had been reduced from 0.81 inch to 0.33 inch, that is, a deformation of about 60%. The pressure was released and the sample was cooled. The final product had a density of 3.18 g./cc. or 99+% of the maximum. It had a composition corresponding to the formula $Na_2O \cdot 8Al_2O_3$.

The specific resistivity of the product as measured in accordance with the method already described was 11–14 ohm/cm. at 290° C. Laue X-ray pattern were made of samples of products of Examples I and II both along the direction of forging/pressing and perpendicular thereto to determine orientation. The product of Example I showed 20% orientation (a random distribution being 0%) while the material in accord with the invention (Example II) showed 80–85% orientation.

EXAMPLE III

The general experiment of Example II was repeated with the variation that additive amounts of lithium were added to the starting materials. The specific resistivity of this product as well as of some conventionally-prepared beta aluminas was measured.

| Sample: | Specific resistivity at 300° C., ohm/cm. |
|---|---|
| Lithium-doped product of the invention | 6 |
| Conventionally sintered polycrystalline beta alumina | 33 |
| Single crystal beta alumina | |
| In the basal plane | 8 |
| Along C axis | 1000 |

ILLUSTRATIVE EMBODIMENTS (A) The experiment of Example II is repeated with the following changes. Both in the hot-pressing and in the hot-forging, the temperature is raised only to 1400° C. An 8000 p.s.i. pressure is used. The hot-pressing is continued for 30 minutes instead of 10 minutes. The hot-forging would require 15 minutes to achieve a deformation of about 50%. The final product would exhibit an oriented crystal structure and would have a specific conductivity similar to that of the product of Example II.

(B) The experiment of Example II is repeated twice with the following changes. The first time, the forging is continued until a deformation of about 65% is achieved, i.e., the original dimension along the axis of forging is reduced to 35% of its original value. The second time the sample is only forged 35%. Both products would exhibit the desired oriented crystal structure. If the forging were permitted to continue only until a 15% deformation would be noted, the desired orientation would not be achieved.

(C) The process of Example III is repeated 5 times. Different additives are blended with the sodium oxide and aluminum oxide powders. 1% by weight magnesia is added in one case, 3% by weight of magnesia is added in another, 1% by weight of silica in a third and 1% by weight of yttria in the fourth. All the samples would behave similarly in fabrication and all would show the desired oriented crystal structure in their final products. It would be expected that these products would have excellent conductivities, similar to those of Example III.

(D) The experiment of Example II is repeated except that as in starting materials are employed sodium oxide powder and alumina powder in the ratio corresponding to $Na_2O \cdot 5Al_2O_3$. The powders are less than 1 micron in size. The final product would have similar properties to the final product of Example II.

COMPARATIVE EXPERIMENTS (A) A sodium beta alumina powder having a grain size of about 10 microns was sintered in air at 1700° C. without pressure until it formed a solid body. This body had an unoriented crystal structure. Hot-forging of the body was then attempted. 6000 p.s.i. was applied at a temperature of 1500° C. The body showed no ductility or tendency to forge, fracturing instead.

(B) Pure aluminum hydroxide was hot-pressed in accord with Example I. Forging was attempted. The sample was heated to about 1500° C. and 6000 p.s.i. was applied. Nothing happened. The temperature was gradually increased. At 1667° C., without evidencing measurable deformation, the sample failed.

(C) An intimate mixture of sodium carbonate and aluminum hydroxide powders as employed in Example I are loaded into a die and sintered into a solid body without applying pressure. The forging of this body is attempted. The body would not be ductile at temperatures below 1800° C. and would fracture.

We claim as our invention:

1. The process for preparing sodium beta alumina which comprises admixing as powders having average grain sizes of less than about 2 microns an oxidic compound of aluminum and an oxidic compound of sodium; hot-pressing the resulting admixture at a temperature of from about 1000° C. to about 1800° C. at a pressure of from about 1000 p.s.i. to about 30,000 p.s.i. for a period sufficient to produce a solid body having a density of not less than about 90% of the theoretical maximum; and then hot-forging the solid body at a temperature of from about 1000° C. to about 1800° C. and a pressure of from about 1000 p.s.i. to about 30,000 p.s.i. from about 1 to about 30 minutes until about 30% to 70% deformation is achieved.

2. The process in accord with claim 1 wherein the hot-pressing is carried out at a pressure of from 3000 p.s.i. to 20,000 p.s.i. and a temperature of from 1200° C. to 1700° C.

3. The process in accord with claim 2 wherein the oxidic compound of aluminum is selected from the group consisting of the aluminas and aluminum hydroxide and the oxidic sodium compound is selected from the group consisting of sodium oxide, sodium carbonate and sodium bicarbonate.

4. The process in accord with claim 3 wherein the oxidic aluminum compound and the oxidic sodium compound are present in amounts sufficient to give an aluminum to sodium atomic ratio of from about 4:1 to about 11:1.

5. The process in accord with claim 4 wherein the hot-forging is carried out at a pressure of from 3000 p.s.i. to 20,000 p.s.i. and a temperature of from 1200° C. to 1700° C.

6. The process in accord with claim 4 wherein the admixture consists essentially of an oxidic sodium compound, an oxidic aluminum compound and from 0 to 5% by weight of conductivity-improving additives.

7. The process in accord with claim 6 wherein the admixture consists of aluminum hydroxide and sodium carbonate.

8. The process for preparing sodium beta alumina which comprises forming an intimate admixture comprising 0.02 to 2 micron grains of an oxidic aluminum compound selected from the group consisting of alumina and aluminum hydroxide and from 0.02 to 2 micron grains of an oxidic sodium compound selected from the group consisting of sodium oxide, sodium carbonate and sodium bicarbonate in proportions yielding ratios of aluminum to sodium atoms of from about 4 to 1 to about 11 to 1; hot-pressing the admixture by applying a temperature of from 1400° C. to 1600° C. and pressure of from 4000 p.s.i. to 10,000 p.s.i. for from 7 to 15 minutes thereby forming a solid body having a density of from 95% to 100% of the theoretical maximum; and hot-forging the solid body by applying a temperature of from 1400° C. to 1600° C. to the body while applying deforming pressure of from 5000 p.s.i. to 10,000 p.s.i. to opposite sides of the body along an axis of deformation for a period selected in the range of from 6 to 15 minutes such that the dimension of the body along the axis of deformation is reduced from an original value to from 0.3 to 0.7 of said original value.

References Cited

UNITED STATES PATENTS 3,743,543    7/1973    Chiku et al.

HERBERT T. CARTER, Primary Examiner

U.S. Cl. X.R.

106—65; 136—153; 423—600